(12) United States Patent
Bielas et al.

(10) Patent No.: US 8,552,350 B2
(45) Date of Patent: Oct. 8, 2013

(54) MITIGATION OF DRIFT EFFECTS IN SECONDARY INERTIAL MEASUREMENTS OF AN ISOLATED DETECTOR ASSEMBLY

(75) Inventors: Michael S. Bielas, Tucson, AZ (US);
Edward C. Schlatter, Tucson, AZ (US);
Andrew B. Facciano, Tucson, AZ (US);
Philip C. Theriault, Tucson, AZ (US);
James A. Ebel, Vail, AZ (US); Robert J. LaPorte, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1 day.

(21) Appl. No.: 13/350,787

(22) Filed: Jan. 15, 2012

(65) Prior Publication Data

US 2013/0181086 A1 Jul. 18, 2013

(51) Int. Cl.
| | |
|---|---|
| *F41G 7/22* | (2006.01) |
| *F42B 15/01* | (2006.01) |
| *G01S 13/89* | (2006.01) |
| *F41G 7/00* | (2006.01) |
| *F42B 15/00* | (2006.01) |
| *G01S 13/00* | (2006.01) |

(52) U.S. Cl.
USPC ......... 244/3.16; 244/3.1; 244/3.15; 244/3.19; 244/3.23; 396/419; 396/427; 359/554; 342/175; 342/176; 342/179

(58) Field of Classification Search
USPC ............... 244/3.1–3.3, 158.1, 164; 89/1.11; 33/227, 275 R, 275 G, 263, 266, 290, 292, 33/299; 396/7, 12, 13, 419, 427, 428; 700/90, 700/302; 359/554, 555, 556, 557; 342/25 R–25 F, 52–55, 175, 176, 179
See application file for complete search history.

(56) References Cited

U.S. PATENT DOCUMENTS

| | | | | |
|---|---|---|---|---|
| 4,396,878 | A * | 8/1983 | Cole et al. ................... | 244/3.15 |
| 4,520,973 | A * | 6/1985 | Clark et al. ................. | 244/3.16 |
| 4,637,571 | A * | 1/1987 | Holder et al. ............... | 244/3.16 |
| 4,702,435 | A * | 10/1987 | Montgomery et al. ...... | 244/3.13 |
| 5,088,818 | A * | 2/1992 | Nicholson ................... | 244/3.16 |
| 5,323,987 | A * | 6/1994 | Pinson ........................ | 244/3.16 |
| 5,452,869 | A * | 9/1995 | Basuthakur et al. ........ | 244/164 |

(Continued)

OTHER PUBLICATIONS

Hablani, Hari B. "Endgame Guidance and Relative Navigation of Strategic Interceptors with Delays," The Boeing Company, Huntington Beach, California 92803, Journal of Guidance, Control, and Dynamics vol. 29, No. 1, Jan.-Feb. 2006, pp. 82-94.

(Continued)

*Primary Examiner* — Bernarr Gregory
(74) *Attorney, Agent, or Firm* — Eric A. Gifford

(57) ABSTRACT

The 6-axis position and attitude of an imaging vehicle's detector assembly is measured by mounting the detector assembly on a compliant isolator and separating the main 6-axis IMU on the vehicle from a secondary IMU comprising at least inertial rate sensors for pitch and yaw on the detector assembly. The compliant isolator couples low-frequency rigid body motion of the vehicle below a resonant frequency to the isolated detector assembly while isolating the detector assembly from high-frequency attitude noise above the resonant frequency. A computer processes measurements of the 6-axis rigid body motion and the angular rate of change in yaw and pitch of the isolated detector assembly to mitigate the drift and noise error effects of the secondary inertial rate sensors and estimate the 6-axis position and attitude of the detector assembly.

20 Claims, 8 Drawing Sheets

(56) References Cited

U.S. PATENT DOCUMENTS

| | | | |
|---|---|---|---|
| 5,523,887 A * | 6/1996 | Wight | 359/556 |
| 5,544,843 A * | 8/1996 | Johnson | 244/3.11 |
| 5,638,303 A * | 6/1997 | Edberg et al. | 700/302 |
| 5,894,323 A | 4/1999 | Kain et al. | |
| 6,263,160 B1 * | 7/2001 | Lewis | 396/13 |
| 6,596,976 B2 * | 7/2003 | Lin et al. | 244/3.2 |
| 8,022,991 B1 | 9/2011 | Kancler et al. | |
| 8,326,532 B2 | 12/2012 | Kmiecik et al. | |
| 8,430,578 B1 * | 4/2013 | Theriault | 396/427 |
| 2009/0216451 A1 | 8/2009 | Barnes et al. | |

OTHER PUBLICATIONS

Waegli et al., "Noise reduction and estimation in multiple micro-electro-mechanical inertial systems," IOP Publishing, Measurement Science and Technology, 21 (2010), 065201, published Apr. 21, 2010, pp. 1-12.

Osman et al.. "Multi-Sensor Inertial Navigation Systems Employing Skewed Redundant Inertial Sensors." ION GNSS 19th International Technical Meeting of the Satellite Division, Sep. 26-29, 2006, Fort Worth, TX., pp. 2202-2207.

Ryan Hanson, "Using Multiple MEMS IMUs to form a Distributed Inertial Measurement Unit," AFIT/GE/ENG/05-06, Department of the Air Force, Air University, Air Force Institute of Technology, Wright-Patterson Air Force Base, Ohio: Mar. 2005, pp. 1-106.

Jared B. Bancroft, "Multiple IMU Integration for Vehicular Navigation," ION GNSS 2009. Session D2. Savannah, GA, Sep. 22-25, 2009, pp. 1-13.

* cited by examiner

MITIGATION OF DRIFT EFFECTS IN SECONDARY INERTIAL MEASUREMENTS OF AN ISOLATED DETECTOR ASSEMBLY

RELATED APPLICATION

This patent application is related to U.S. patent application entitled "SEPARATION OF MAIN AND SECONDARY INERTIAL MEASUREMENTS FOR IMPROVED LINE OF SIGHT ERROR OF AN IMAGING VEHICLE'S ISOLATED DETECTOR ASSEMBLY", Ser. No. 13/300,058, filed Nov. 18, 2011, the entire contents of which is incorporated by reference now U.S. Pat. No. 8,430,578.

BACKGROUND OF THE INVENTION

1. Field of the Invention

This invention relates to imaging vehicles that are provided with a detector assembly for imaging a scene, and more particularly to the measurement of a 6-axis position and attitude of the imaging vehicle and its detector assembly to improve line-of-sight (LOS) error.

2. Description of the Related Art

An imaging vehicle provides a platform on which a detector assembly is mounted. The vehicle, which includes a propulsion system, may, for example, be a spacecraft, a manned aircraft, an unmanned aerial vehicle (UAV), a missile interceptor, a kinetic energy kill vehicle (KV) interceptor, a land-based vehicle or a ship. The detector assembly includes a telescope (e.g. an optical mirror and/or lens assembly) and one or more detectors that capture images of a scene in the infrared (IR), visible or millimeter wave (MMW) bands of the electromagnetic spectrum. The detector assembly may be single-band or multi-band.

A 6-axis tactical, navigation or strategic grade Inertial Measurement Unit (IMU) mounted on the vehicle frame provides measurements of both the linear acceleration and angular rate which is processed to give position and attitude of the vehicle. The IMU typically comprises a ring laser gyro, fiber gyro or hemispheric resonator gyro that exhibit good drift performance over a period of time appropriate to the mission duration. Mechanical isolation is commonly used to mechanicaly low-pass filter the vibrations and body motion observed by the main IMU.

Generally the inertial instrument block (gyroscopes and accelerometers) is center of gravity mounted with mechanical isolators within an outer case; the net structure is then termed the IMU. The IMU measures linear acceleration along the orthogonal x, y and z axes and rate of change of angle (roll, pitch and yaw) about those axis to determine the 6-axis position and attitude of the detector assembly for guidance, navigation and control (GNC) maneuvers. A line extending from the center of the optical system out a great distance to an object in the center of the field of view (FOV) may also be referred to as the line-of-sight (LOS).

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides an imaging vehicle architecture that partially isolates the detector assembly from the vehicle frame and separates the main 6-axis inertial measurement of the vehicle frame from a secondary inertial rate measurement of the detector assembly to account for relative movement between the detector assembly and vehicle frame in order to provide a more benign shock and vibration environment for the detector assembly and to improve the LOS measurement error of the detector assembly. The measurements are processed to mitigate drift and noise error effects associated with the secondary inertial measurements.

In an embodiment, this is accomplished by mounting the detector assembly on a compliant isolator on the vehicle frame. The compliant isolator isolates the detector assembly from high-frequency attitude noise while coupling the low-frequency rigid body motion of the vehicle frame to the detector assembly. A main IMU measures the 6-axis rigid body motion of the vehicle frame. A secondary IMU comprising at least two secondary rate sensors, which exhibit a drift including a fixed offset component and a time-varying component, measure at least the angular rate of change in pitch and yaw of the detector assembly. A computer processes the measurements of 6-axis rigid body motion and angular rate of change in pitch and yaw of the detector assembly to estimate a 6-axis position and attitude of the isolated detector assembly, hence LOS variation relative to the vehicle. The computer processes both the main and secondary inertial measurements to estimate and remove the drift of the secondary rate sensors.

In an embodiment, the computer treats the main IMU measurement as a truth reference. The computer forms a difference signal between the main IMU measurement and the secondary rate sensor measurement. The computer processes the difference signal to form an estimate of the drift. The estimator may, for example, be a low pass filter, integrator, Least Squares Estimator or Kalman filter. The estimate is subtracted from the secondary measurement to produce a corrected secondary measurement.

In an embodiment, the main IMU is of tactical, navigation or strategic grade exhibiting a specified drift performance over a time period sufficient for the mission of the imaging vehicle. The secondary IMU may be smaller, lighter weight and less expensive, hence exhibits an inferior drift performance. The secondary rate sensors may comprise an individual gyroscope, spinning mass gyroscope, piezoelectric angle rate sensors, Micro-Electro Mechanical System (MEMS) angle rate sensors, magnetohydrodynamic angular rate sensors, multisensory or a 6-axis IMU, possibly a MEMS-based IMU, in which only the pitch and yaw sensors are utilized.

In another embodiment, a secondary IMU that includes the secondary rate sensors measures a 6-axis rigid body motion of the detector assembly. A 6-axis MEMS-based IMU may be used. The computer processes acceleration measurements in x, y and z to either provide or improve the drift estimates for the secondary rate sensors in pitch and yaw.

In an embodiment, a cluster of sensors provides multiple measurements of the angular rate of change in pitch and yaw of the detector assembly to mitigate noise effects associated with the secondary sensors.

These and other features and advantages of the invention will be apparent to those skilled in the art from the following detailed description of preferred embodiments, taken together with the accompanying drawings, in which:

DETAILED DESCRIPTION OF THE INVENTION

Figure 1:
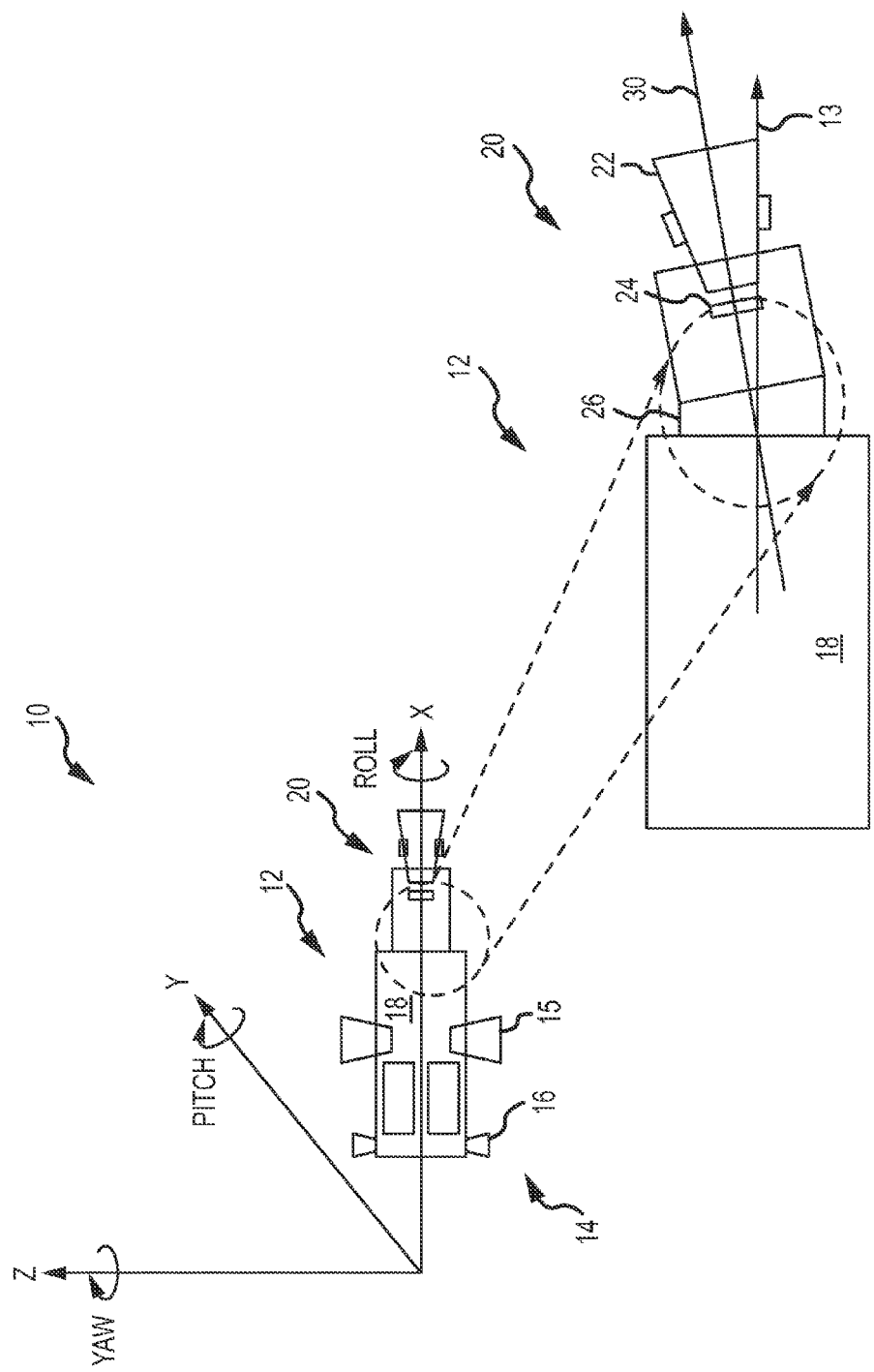
FIG. 1 is a diagram of an imaging vehicle having an isolated detector assembly positioned within a coordinate system to roll about the x-axis and pitch and yaw about and y-axis and z-axis, respectively, with a LOS error between the vehicle and detector assembly in yaw and pitch.

The present invention provides an imaging vehicle architecture and method of measuring 6-axis position and attitude of the vehicle's detector assembly. The detector assembly, or at least an isolated sub-assembly comprising the imaging components of the telescope and detector, is mounted on a compliant isolator. The compliant isolator and detector assembly mass together exhibit a system resonant frequency. The compliant isolator couples low-frequency rigid body motion of the vehicle below the system's resonant frequency to the isolated sub-assembly while isolating the sub-assembly from high-frequency attitude noise above the resonant frequency to provide a benign shock and vibration environment for capturing images of the scene. The main 6-axis IMU on the vehicle frame is separated from secondary inertial sensors on the isolated sub-assembly. The secondary inertial rate sensors measure at least the angular rate of change in yaw and pitch of the isolated sub-assembly. The secondary inertial rate sensors exhibit a "drift" over time and angle random walk noise. The measurements of the main IMU and secondary inertial rate sensors are processed to estimate and remove the drift and noise error effects ("sensor error"). The measurements of the 6-axis rigid body motions and the angular rate of change in yaw and pitch of the isolated detector assembly are used by the guidance, navigation and control (GNC) software to estimate the accurate position of the imaged scene relative to the vehicle in order to calculate what actions to take. That is, the image motion is directly correlated with the pitch and yaw (and to a far lesser degree the roll) such that the imaged objects can be realigned with high accuracy in successive image frames.

As used herein, an imaging vehicle is any type of vehicle provided with a propulsion system and a detector assembly for capturing images of a scene. The imaging vehicle may, for example, be spacecraft, a manned aircraft, an unmanned aerial vehicle (UAV), a missile interceptor, a kinetic energy kill vehicle (KV) interceptor, a land-based vehicle or sea-based vehicle. The detector assembly comprises at least a telescope for capturing electromagnetic energy and a detector for imaging the captured electromagnetic energy. The telescope and detector may operate in the IR, visible or MMW bands and may be configured as single-band or multi-band devices.

In some embodiments, the main IMU is of tactical, navigation or strategic grade exhibiting a specified drift performance over an extended time period. The main IMU typically comprises a ring laser gyro, fiber gyro or hemispheric resonator gyro that exhibit good drift performance over a period of time appropriate to the mission duration. The secondary IMU (at least two rate sensors for pitch and yaw or full 6-axis) is generally smaller, lighter weight and less expensive than the tactical, navigation or strategic grade main IMU. Less weight lowers the isolated mass and the volume required for the assembly and reduces overall cost. The rate sensors may comprise an individual gyroscope, spinning mass gyroscope piezoelectric angle rate sensors, MEMS angle rate sensors, magnetohydrodynamic angular rate sensors, multisensor or a 6-axis IMU, possibly a MEMS-based IMU, in which only the pitch and yaw sensors are utilized. Consequently, the secondary IMU exhibits an inferior drift performance. This may be specified as either the same drift over a shortened time period e.g. at least one order of magnitude (i.e. 10×) difference, or a larger drift over a comparable time period. The present invention processes both the main and secondary IMU measurements to mitigate the effects of drift on the secondary measurements.

Figure 2:
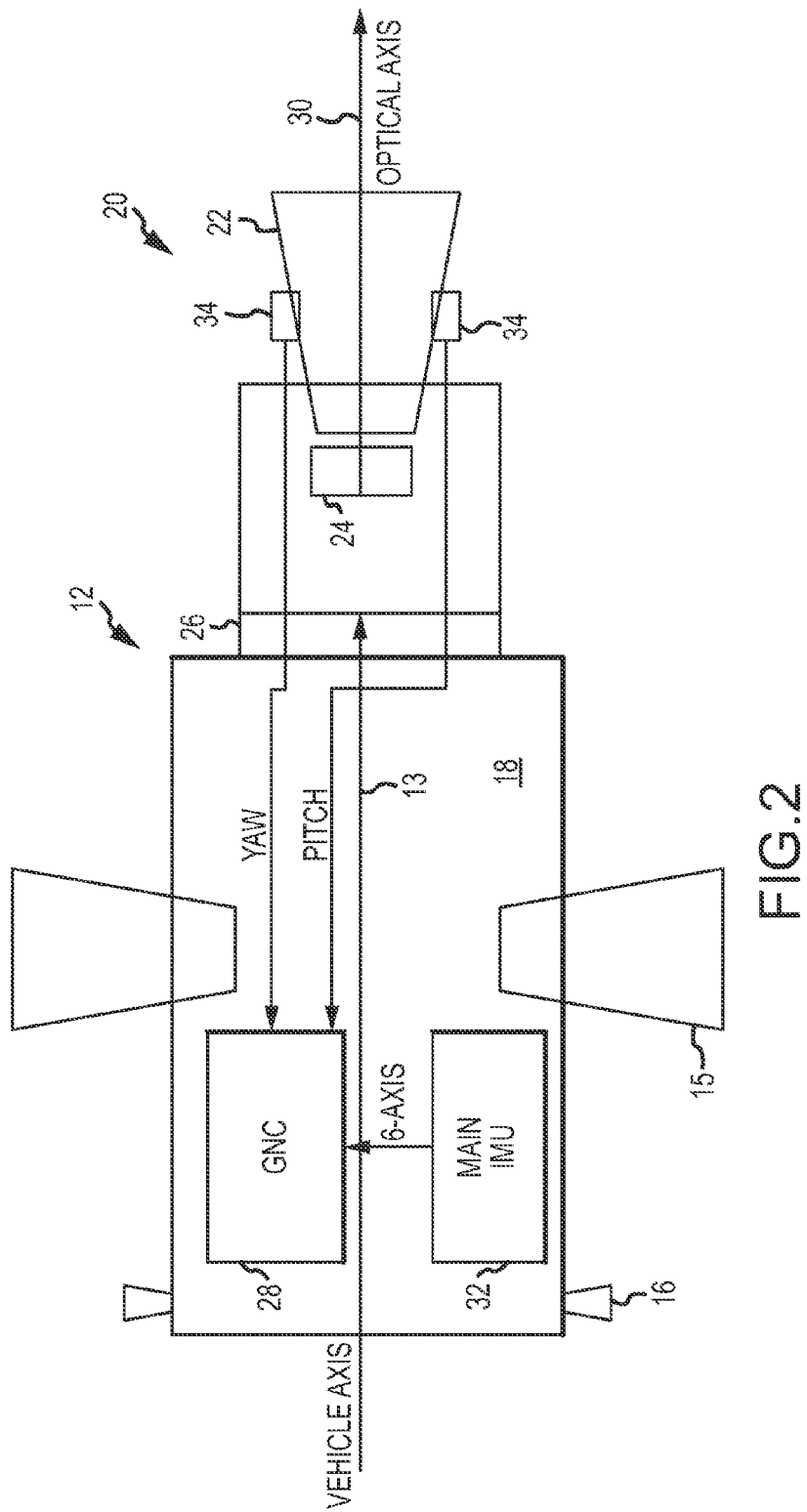
FIG. 2 is a block diagram of an embodiment of an imaging vehicle in which a main guidance IMU measures the 6-axis rigid body motion of the imaging vehicle and at least two rate sensors measure the angular rate of change in yaw and pitch of the isolated seeker.
Figure 3:
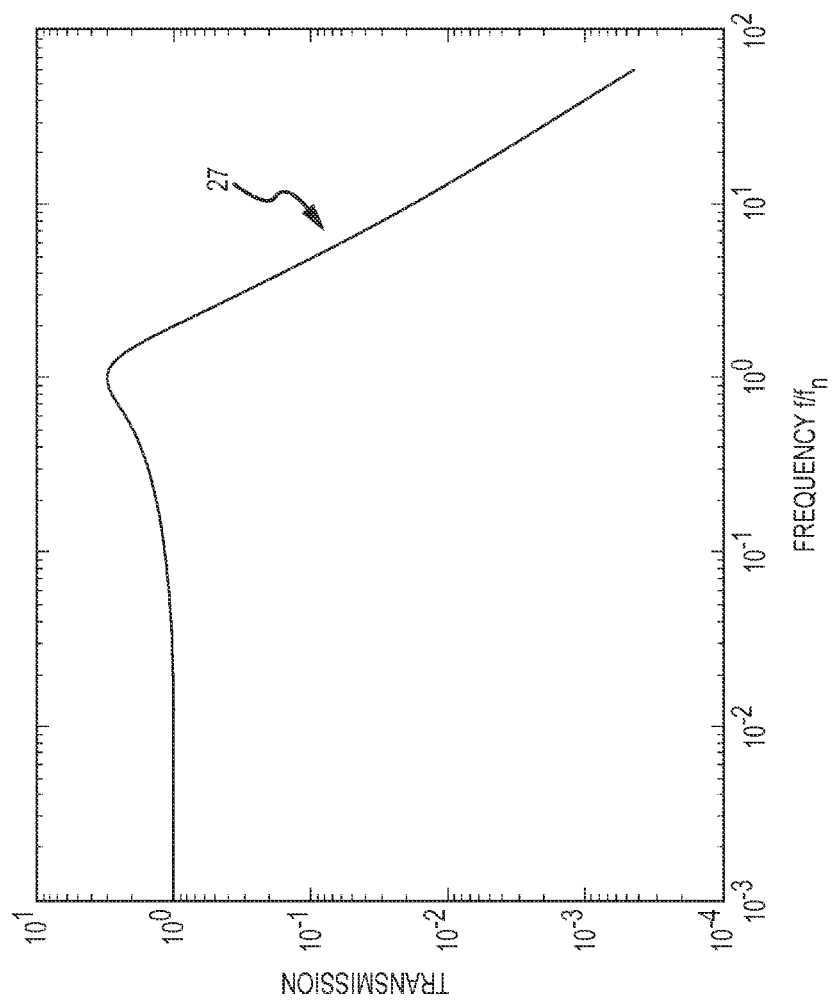
FIG. 3 is a plot of gain vs. normalized frequency illustrating the resonance properties of the isolator that transfer rigid body motion at low frequencies while attenuating high-frequency attitude noise.

Referring now to FIGS. 1, 2 and 3, a coordinate system 10 is defined by orthogonal x, y and z-axes. Rotation about the x-axis is roll, about the y-axis is pitch and about the z-axis is yaw. An imaging vehicle 12 is positioned in coordinate system with its frame axis 13 coincident with the x-axis. Imaging vehicle 12 includes a propulsion system 14 such as provided by divert thrusters 15 and attitude control thrusters 16 mounted on a frame 18. Different vehicles will have different types of propulsion systems. Imaging vehicle 12 includes a detector assembly 20 comprising a telescope 22 for capturing EM radiation of a scene and at least one detector 24 for sensing the captured EM radiation to produce a sequence of images. Telescope 22 may include one or more mirrors and/or one or more lenses for capturing and focusing a desired band of EM radiation onto one or more detectors in the IR, visible or MMW bands.

During flight, the imaging vehicle experiences forces that cause it to accelerate either linearly or rotationally, referred to as "rigid body motion". For example, firing the thrusters or wind may induce rigid body motion. For GNC it is important to accurately measure rigid body motion to estimate the 6-axis position and attitude of the imaging vehicle.

Rigid body motion may be represented as having two components. A lower frequency component tracks the general movement of the imaging vehicle. A higher frequency component represents noise such as due to shock or vibration. Noise may be positional noise that accelerates the interceptor in x, y or z or attitude noise in the angular rate of change in roll, pitch or yaw.

To provide a more benign environment for capturing images of the scene, the detector assembly 20 is mounted on a compliant isolator 26 attached to frame 18. The mass of the detector assembly 20 (or at least the isolated components thereof) and compliant isolator 26 define a system that exhibits a resonant frequency. The mass of the imaging vehicle is assumed to be much larger than the isolated mass; hence its effect on the resonant system is negligible. Rigid body motion at frequencies below the resonant frequency is coupled to the detector assembly 20 so that the assembly tracks the general movement of the imaging vehicle. In some embodiments, attitude noise in pitch and yaw at frequencies above the resonant frequency is at least partially attenuated to detector assembly 20 to isolate the assembly from various sources of noise. In other embodiments, attitude noise in roll above a resonant frequency may also be attenuated. In other embodiments, position noise above a resonant frequency may also be attenuated. Compliant isolator 26 may be designed to exhibit different resonant frequencies to different components of rigid body motion.

FIG. 3 plots the transmission 27 of the rigid body motion through the compliant isolator to the isolated mass of the detector assembly against normalized frequency i.e. the ratio of actual frequency f to the resonant frequency $f_n$. As shown, at frequencies below the resonant frequency, the transmission is approximately one; hence the rigid body motion is coupled to the detector assembly. At frequencies above the resonant frequency (e.g. noise), the transmission is less than one and the noise is attenuated. Generally speaking, the higher the frequency of the noise the greater the attenuation. Furthermore, for an isolator of a given compliance the higher the isolated mass the lower the resonant frequency and the greater the isolation, stated inversely, for a constant isolated mass, the greater the compliance of the isolator, the lower the resonant frequency. At or near resonance, the rigid body motion may actually be amplified to some extent. Sources of damping may be introduced into the system to limit this amplification. Additionally, the system is suitably designed so that the resonant frequency of the system is not near the excitation frequencies of the propulsion system.

In an embodiment, the compliant isolator has a resonant frequency between 5 Hz and 5 kHz. In another embodiment, the compliant isolator has a resonant frequency between 100 Hz and 500 Hz. In another embodiment, the compliant isolator has a resonant frequency between 200 Hz and 300 Hz.

In an embodiment of imaging vehicle 12, compliant isolator 26 isolates the detector assembly 20 from attitude noise in pitch and yaw to provide a more benign environment for capturing images of the scene. The compliant isolator may be symmetric and exhibit the same or approximately the same resonant frequencies in yaw and pitch. Furthermore, the vehicle's GNC is relatively very insensitive to detector assembly position noise in x, y and z. In other embodiments, the compliant isolator may be configured to attenuate roll noise as well and/or position noise.

Isolation of the detector assembly from the imaging vehicle frame provides a more benign environment for capturing images of the scene but induces LOS errors in pitch and yaw between the detector assembly and the frame as shown by divergence of the detector assembly axis 30 from frame axis 13 in FIG. 1. A main 6-axis IMU 32 is coupled to measure the 6-axis rigid body motion of the vehicle's frame 18 including linear accelerations in x, y and z directions and angular rates of change of roll, pitch and yaw about the respective x, y and z axes. Generally the main IMU's inertial instrument block (gyroscopes and accelerometers) is center of gravity mounted with mechanical isolators within an outer case to the vehicle frame. The resonant frequency of the main IMU may be either higher or lower than that of the detector assembly. At least two secondary sensors 34 (which may be combined into a single package) are mounted on the isolated detector assembly to measure the angular rate of change in yaw and pitch of the isolated detector assembly 20. A GNC computer 28 processes measurements of the 6-axis rigid body motion and measurements of the angular rate of change in yaw and pitch of the isolated sub-assembly to estimate a 6-axis position in x, y and z and attitude in roll, pitch and yaw of the isolated detector assembly. Another component of LOS error is the measurement drift and angle random walk noise exhibited by the secondary rate sensors. The measurements of the main IMU and secondary inertial rate sensors are processed to estimate and remove the drift and noise error effects.

In some embodiments, detector assembly 20 includes an isolated sub-assembly comprising imaging components of telescope 22 (e.g. a telescope structure, one or more lenses and/or one or more mirrors) and detector 24 mounted on the compliant isolator 26. The at least two sensors 34 are coupled to measure the angular rate of change in yaw and pitch of the isolated sub-assembly. The sensors may be mounted on the telescope structure that mounts the optical components and positions them relative to each other, telescope structure that supports the isolated sub-assembly or components of the telescope itself In another embodiment, the detector assembly further includes a non-isolated sub-assembly comprising non-imaging components such as a cryogenic cooling system for the detector, a sunshade and a mechanical structure that supports the cooling system and sunshade, and the computer that are rigidly mounted to the vehicle frame. In another embodiment, the isolated sub-assembly is configured with only a minimal set of imaging components required to image the scene in order to reduce or minimize the isolated mass. All non-imaging components are part of the non-isolated sub-assembly. In another embodiment, the isolated sub-assembly may include one or more of the non-imaging components.

In some embodiments, the compliant isolator attenuates attitude noise in roll as well and at least three sensors measure the angular rate of change in yaw, pitch and roll of the isolated detector assembly. In some embodiments, the compliant isolator attenuates position noise.

Figure 4:
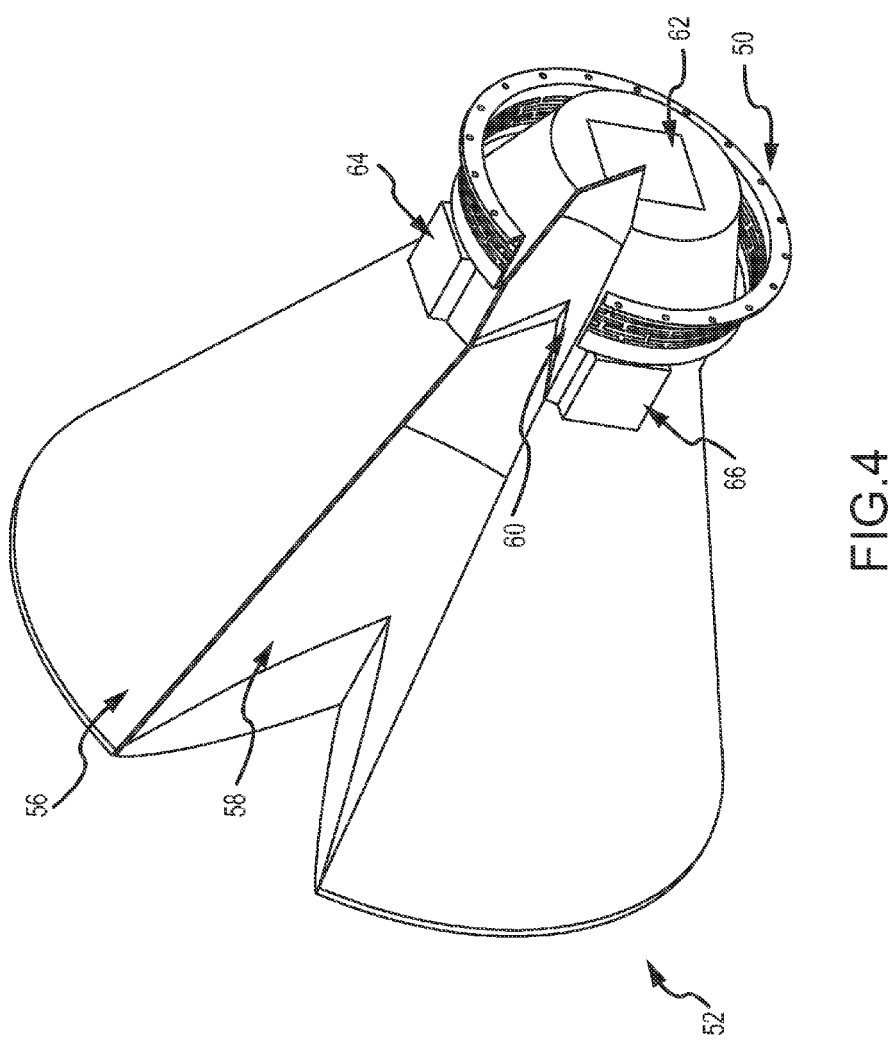
FIG. 4 is a section view of an embodiment of a vehicle's imaging system including the compliant isolator and a pair of rate sensors that measure the angular rate of change in yaw and pitch.

FIG. 4 illustrates an embodiment of a compliant isolator 50 for mechanical coupling to the frame of an imaging vehicle and an isolated imaging sub-assembly 52 of a detector assembly mounted thereon. Compliant isolator 50 comprises a metal ring that has been machined in a pattern such as to reduce its stiffness, hence lower the system resonant frequency in both yaw and pitch to between 5 Hz and 5 kHz. In this embodiment, the metal ring retains its relatively greater stiffness in roll and the x, y and z directions. Consequently, isolator 50 attenuates attitude noise in both pitch and yaw above the resonant frequency. Other embodiments of the compliant isolator may comprise coil springs, torsion springs, metal flexures, rubber mounts, wire rope mounts or bearings to name a few.

Imaging sub-assembly 52 comprises a telescope structure 56, primary and secondary lenses 58 and 60, respectively, and a detector 62. The primary or secondary lenses may be simple or compound lenses. The primary lens 58 gathers EM radiation and in combination with the second lens 60 focuses an image of the scene in front of the telescope onto the detector 62. In this particular embodiment, the imaging sub-assembly comprises only a minimum configuration of imaging elements i.e. a telescope structure, lens/mirror components and a detector to minimize the isolated mass. The compliant isolator is the only mechanical connection between the imaging sub-assembly 52 and the imaging vehicle frame. Other electrical connections and coolant lines may be connected from the interceptor to the detector.

A pair of angle rate sensors 64 and 66 are mounted on telescope structure 56 90 degrees apart so that one sensor measures angular rate of change in yaw and the other sensor measures angular rate of change in pitch. Other configurations of angle sensors are envisioned to measure the angular rates of change in yaw and pitch. In some embodiments, the angle rate sensors each comprise a gyroscopic angular rate sensor or a MEMS angular rate sensors or together comprise a 6-axis MEMS IMU of which only the yaw and pitch sensors are utilized. For example, the angle rate sensor may comprise an Analog Devices ADXRS453 or ADISI6130 Angular Rate Sensor or an ATA ARS-15 Angular Rate Sensor. Unlike tactical, navigation or strategic grade IMUs, these sensors exhibit a substantial drift over time periods typically associated with the mission of an imaging vehicle.

Figure 5:
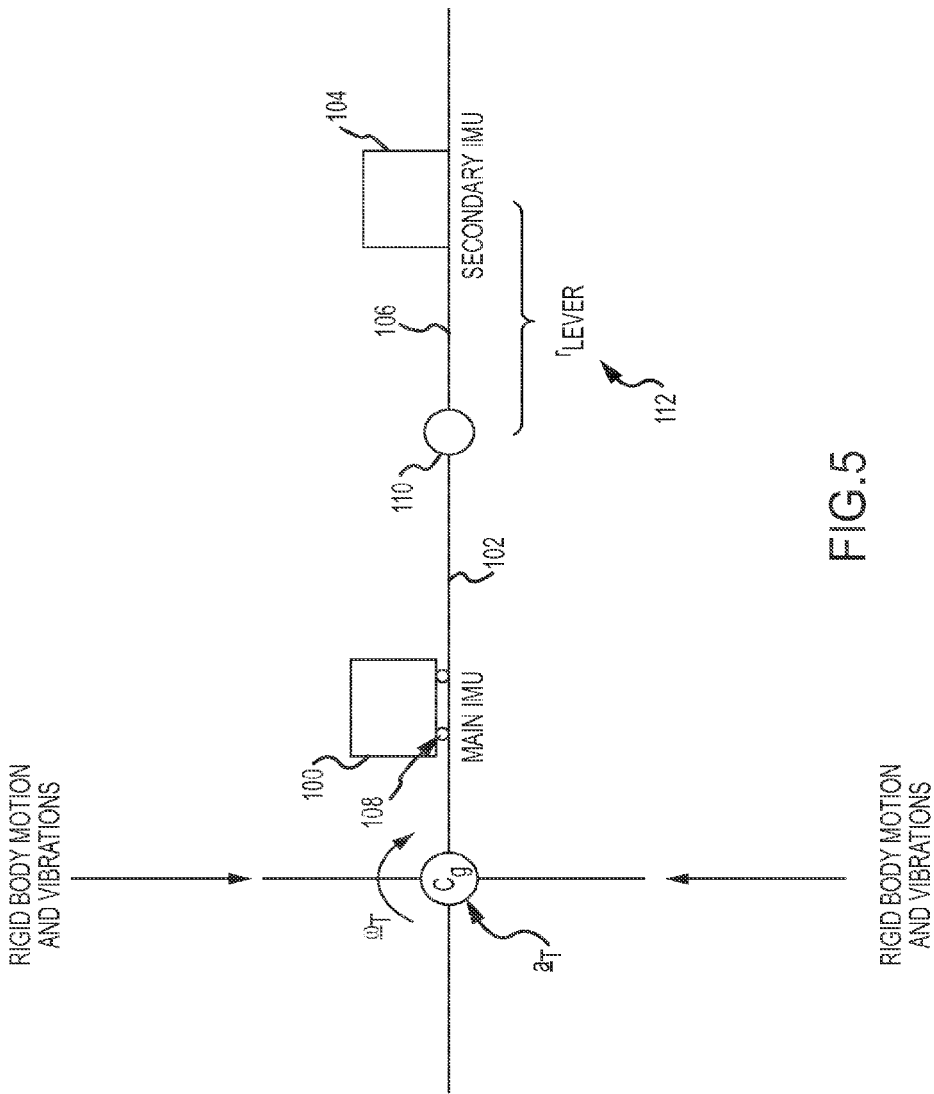
FIG. 5 is a diagram of the main IMU and isolated secondary IMU responsive to accelerations and rotations relative to inertial space.

As shown in FIG. 5, a 6-axis main IMU 100 mounted on a vehicle frame 102 and a secondary IMU 104 (e.g. at least pitch and yaw angle rate sensors) mounted on a detector assembly 106 are responsive to accelerations and rotations relative to inertial space. The inertial frame is assumed to be Newtonian relative to the fixed stars in space. According to standard practice a direction cosine matrix (DCM) describes the coordinate frame rotations from inertial to Earth-centered-Earth-fixed to the navigation frame maintained in the vehicles navigation processor. The GNC processor also maintains the rotation from the navigation frame to the body frame. The vehicle frame is used to compute the Euler angles that correspond to roll, pitch and yaw which is known to someone skilled in the field. For Reference, Eqn. 1 gives the frame rotation sequence from inertial to detector assembly frame:

$$C_b^s C_n^b C_{ecef}^n C_i^{ecef} \quad (1)$$

Here $C_i^{ecef}$ is the DCM corresponding to the inertial to earth-centered earth-fixed coordinate frame, $C_{ecef}^n$ is the DCM relating the earth-centered earth-fixed frame to the navigation frame, $C_n^b$ is the DCM relating the navigation frame to the vehicle body frame, and $C_b^s$ is the DCM relating the body frame and the detector assembly frame. Since these coordinate frames are processed in the navigation processor, the Euler angles or rates and their equivalent pitch, roll, yaw angles, or pitch, roll, yaw rates are computed as is standard practice. The secondary IMU rotation rates have an equivalent Euler angle angular rate that may be integrated to obtain the roll, pitch, and yaw.

The vehicle frame as well as the detector assembly frame experiences an angular rate given by the vector $\omega_T$ in pitch or yaw (and possibly roll) associated with the rigid body motion and vibrations. The detector assembly frame will experience the additional motion $\omega_{pseudo-motion}$ since the detector assembly is compliantly mounted to the main vehicle and thus undergoes "pseudo-motion". The vehicle body angular rates and accelerations sensed by the main IMU can be expressed as $\Omega_T = \omega_T + \delta\omega_{T(drift+noise)}$ and $A_T = a_T + \delta a_{T(drift+noise)}$ where "drift+noise" represents both the measurement drift and the angle random walk associated with a sensor. Similarly the detector assembly angular rates and accelerations sensed by the secondary IMU can be expressed as $\Omega_S = \omega_T + \omega_{pseudo-motion} + \delta a_{S(drift+noise)}$ and $A_S = a_S + \delta a_{S(drift+noise)}$. Here $\overline{\omega}_T$ and $\overline{A}_T$ are the measured angular rates and accelerations, $\overline{\omega}_T$ and $\overline{a}_T$ are the truth applied angular rates and accelerations, and, $\delta\omega_{T(drift+noise)}$ and $\delta a_{S(drift+noise)}$ are the instrumental errors associated with the measured angular rates and accelerations.

Mechanical isolation 108 is commonly used to mechanically low-pass filter the spectral content of the vibrations and rigid body motion. Generally the inertial instrument block (gyroscopes and accelerometers) is center of gravity mounted with mechanical isolators 108 within an outer case; the net structure is then termed the IMU. Since mechanical isolation is used, the IMU position relative to the vehicle frame is preserved on the average by the GNC processor. The typical isolation system uses a typical low-pass cutoff frequency of around 150 Hz, although some variation in that choice is seen. Because the mechanical filter is typically best represented as a two-pole low-pass resonant filter often with a Q or quality factor of around three, the actual motion observed is best described as a pseudo-motion due to the driving excitation applied because of the vehicle's vibrations. Since this pseudo-motion is low frequency (at the resonance) the burden of high-speed processing is relieved. Processing rates of only about 600 Hz to 1800 Hz are required.

While the pseudo-motion of the main IMU does not directly indicate the instantaneous vehicle frame orientations, on the average the vehicle frame orientation is well maintained, since the typical body rate is about 10 Hz. The navigation solution is similarly correct on the average as well, since the pseudo-motions are averaged or smoothed in the navigation processing. This is advantageous since low-rate processing eases the computational burden required in a true strapdown IMU approach (i.e. no mechanical isolation).

Ignoring pseudo-motion, the main IMU measures $\Omega_T = \omega_T$ where $\omega_T$ is the angular rate of the Main IMU's instrument block and $\Omega_T$ is the measurement of that angular rate.

The measurements provided by main IMU 100 can be used to provide a "truth reference." This is valid assumption because the main IMU typically has drift and noise variations that are small enough to be ignored in the processing even if the vehicle is operating free inertially. In addition, since the main IMU commonly receives external updates that are typically blended in the GNC processor, the main IMU can stay calibrated for long periods of time that correspond to the mission time.

A mechanical isolation system 110 (e.g. a compliant isolator) isolates the detector assembly from the vehicle frame and main propulsion unit to reduce the magnitude of the vibrations at detector assembly 106 and provide a more benign environment for the detector assembly. Here again a pseudo-motion between the vehicle frame and detector assembly is observed. The secondary IMU 104 is used to track these detector assembly rotations and possible deflections associated with the pseudo-motion. On average the centerline vectors are preserved between the respective units, vehicle frame 102 and detector assembly 106. Thus each frame, vehicle frame and detector assembly frame, will indicate its own roll, pitch and yaw solution. Using the "truth reference" provided by main IMU 100, any drift or noise terms in the secondary IMU can be estimated or filtered out.

The secondary IMU outputs secondary measurements of the angular rate of change $\Omega_S$ in yaw and pitch of the isolated detector assembly. The secondary measurements include multiple components of angular rate including the same net angular rates as the vehicle frame $\omega_T$ (vector). In addition the secondary IMU will sense the rotations due to the detector assembly pseudo motion $\omega_{pseudo-motion}$ (vector).

The period of the pseudo-motion is typically measured in milliseconds and typical deflections are on the order of 0.1 inches. This is true for the detector assembly as well even if the secondary IMU is not center of gravity mounted and has a finite lever arm 112; the rotations corresponding to what the detector assembly observes in the image plane are preserved. Note, if a finite lever arm exists, the angular rate sensors may be configured as acceleration sensors in y or z that acting through the lever arm 112 measure angular rate of change in pitch or yaw.

Figure 6:
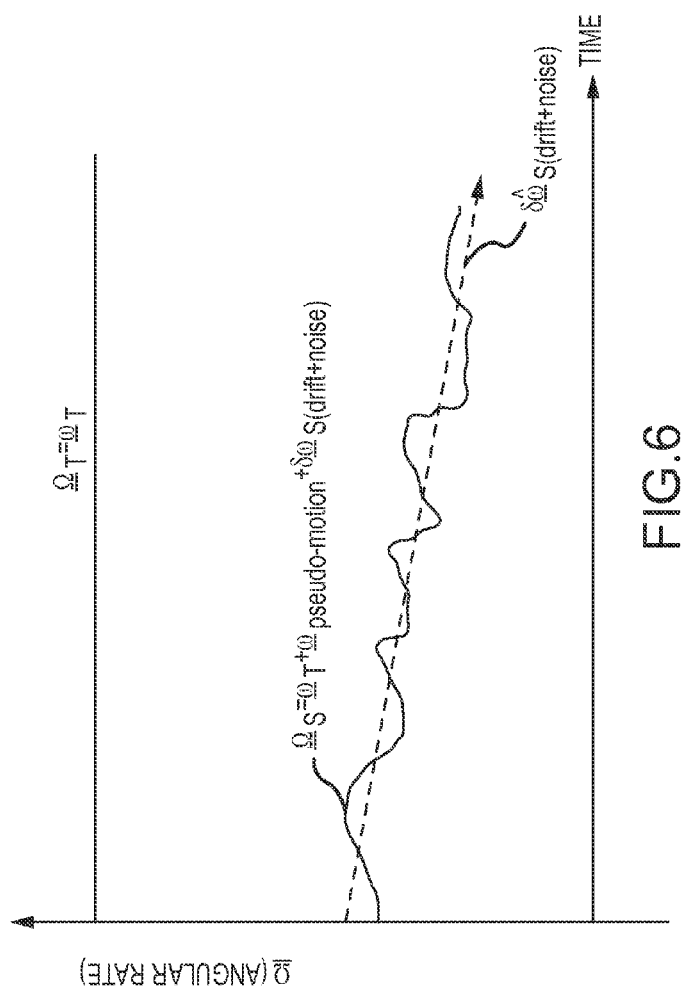
FIG. 6 is a plot of angular rate versus time to illustrate the drift of a secondary rate sensor.

However, the secondary measurement includes a third rotation term $\delta\omega_{S(drift+noise)}$ (vector) associated with the measurement drift of the secondary sensors that although slowly varying would cause erroneous measurements in time and the angle random walk noise. As shown in FIG. 6, assuming a constant angular rate $\Omega_T$, the secondary rate sensor measurement $\Omega_S$ includes a constant offset and a time-varying component. In reality the time-varying component comprises both a drift portion and a random portion that, when integrated as is the case, appear as a slowly varying drift. The period or correlation time of the time-varying drift is typically measured in minutes, at least 10× or 100× longer than that of the signal due to pseudo-motion between the detector assembly and vehicle frame.

As previously mentioned, the error of the secondary rate sensor is mitigated by treating the main IMU as a truth reference since it has low relative drift compared to the secondary IMU. The main IMU orientation is maintained in the navigation processor so, if as is standard practice in the field, external measurements of position, velocity, or orientation are blended into the main navigation solution, this will only serve to improve the functioning of this approach. Even though the main IMU is vibration isolated from the vehicle frame (either internally or externally—one isolator only) the average attitude is well maintained at a sampled data rate high enough to allow the processing described to function. Thus it suffices to estimate the error (drift and noise) of the secondary IMU and subtract the error from the secondary measurement. This estimation can be well accomplished since the stochastic nature of the drift $\delta\omega_{S(drift+noise)}$ differs from the useful, faster, sensed pseudo-motion component $\omega_{pseudo-motion}$.

Figure 7:
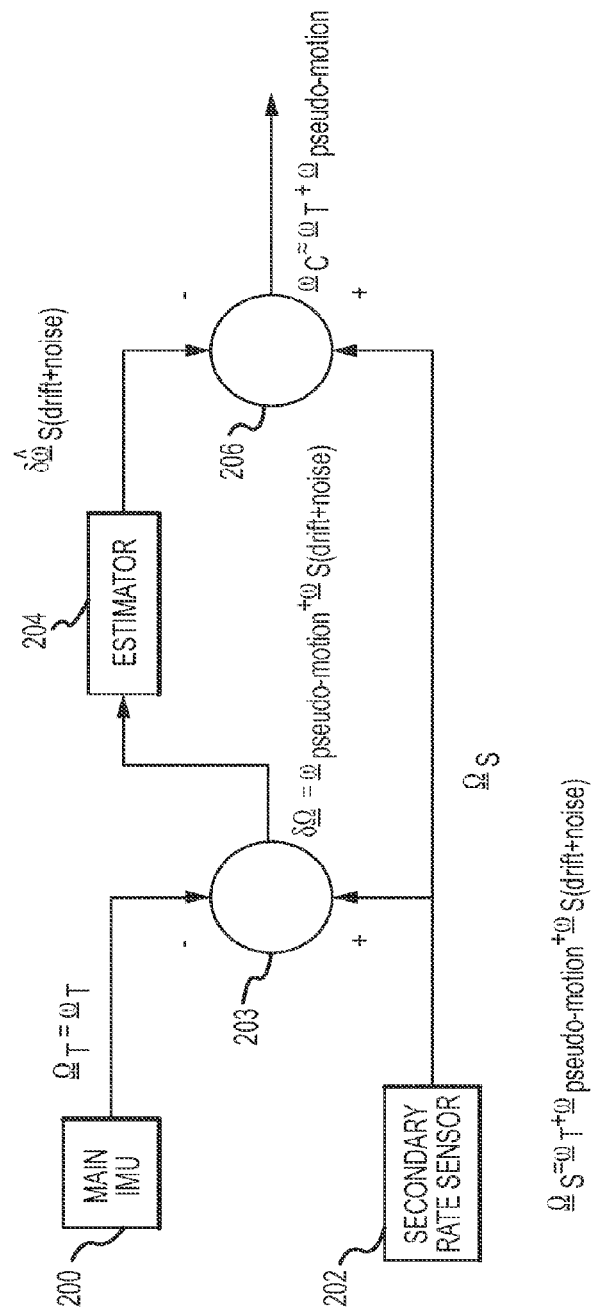
FIG. 7 is a diagram illustrating the processing of the main IMU and isolated detector IMU measurements to estimate and remove the sensor drift and noise error effects.

As shown in FIG. 7, in an embodiment a main IMU 200 outputs an angle rate measurement $\Omega_T$ as the truth reference. A secondary rate sensor 202 outputs an angle rate measurement $\Omega_S$ as a measurement of pitch or yaw. A differencing element 203 subtracts the truth reference $\Omega_T$ from the angle rate measurement $\Omega_S$ to produce a difference angle rate measurement $\delta\Omega$ that includes the slowly varying error (drift and noise) component and the faster varying signal (pseudo-motion) component. An Estimator 204 generates an estimate $\widehat{\delta\omega}_{(drift+noise)}$ of the error. A difference element 206 subtracts the estimate from angle rate measurement $\Omega_S$ yielding a corrected angle rate $\omega_C$ that is approximately the sum $\omega_T + \omega_{pseudo-motion}$. The resulting output of this process yields the true overall vehicle motions $\omega_T$ plus the pseudo-motion $\omega_{pseudo-motion}$ of the detector assembly, which is the useful part needed to correlate image motion with actual detector assembly motion.

A simple approach to implement Estimator 204 is to use a low-pass filter that removes the higher frequency pseudo-motion signal component to estimate the sensor error. The detector assembly solution may be high-pass filtered as well. The actual filter roll-off frequencies will be uniquely and optimally set by the resonances of the isolator and the stochastic nature of the error terms. In general, the cut-off frequency will be above the spectral content of the error and below the spectral content of the pseudo-motion signal. Alternately, the Estimator may be implemented as an integrator with appropriate selection of the integration time constant, long enough to zero out the pseudo-motion signal while short enough to track changes in the sensor error. Higher order estimators can be used, for example, the well known complementary filter or Kalman filter or other. Because the filtering concept above indicates a state or state is present, and since IMUs have sampled-data output formats, a Kalman filter would well suffice. A Least Squares Estimator may also be used. Alternative estimators and estimator architectures are possible including, for example, both feed-forward and feedback configurations, Kalman filters, particle filters, least-squares estimators, Weiner filters, the complementary filter, or even low-pass or high pass filters.

The integration of $\Omega$ over fixed sample time period results in accumulated angles in $\Theta$ over fixed sample time periods. In some embodiments, the Estimator may provide an estimate of accumulated angle $\Theta$ instead of angular rate $\Omega$. In terms of integrated rate over some time period, i.e. the angles (possibly formulated as yaw, pitch, and roll): $\int\Omega_T dt = \int\omega_T dt = \Theta_T$ and $\int\Omega_S dt = \int\omega_T dt + \int\omega_{pseudo-motion} dt + \int\delta\omega_{(drift+noise)} dt = \Theta_T + \Theta_{signal} + \Theta_{error}$. It is required to have a $\Theta_{error}$ small (estimate to insignificance) or eventually the angular displacement $\Theta_T + \Theta_{signal}$ becomes unusable since $\Theta_{error}$ will grow excessively and dominate the process as an error in time. The uncorrected angle measurement $\Theta_S$ "drifts" away from the truth reference $\Omega_T$ over time. However, the corrected angle measurement $\Omega_C$ remains close to the truth reference $\Omega_T$ over time. The difference between $\Omega_S$ and $\Omega_T$ corresponds to the signal term of the pseudo motion between the vehicle frame and the isolated detector assembly. The GNC computer can then process the full 6-axis measurements from the main IMU and at least the corrected yaw and pitch measurements from the secondary IMU to estimate a full-axis position and attitude of the detector assembly.

Figure 8:
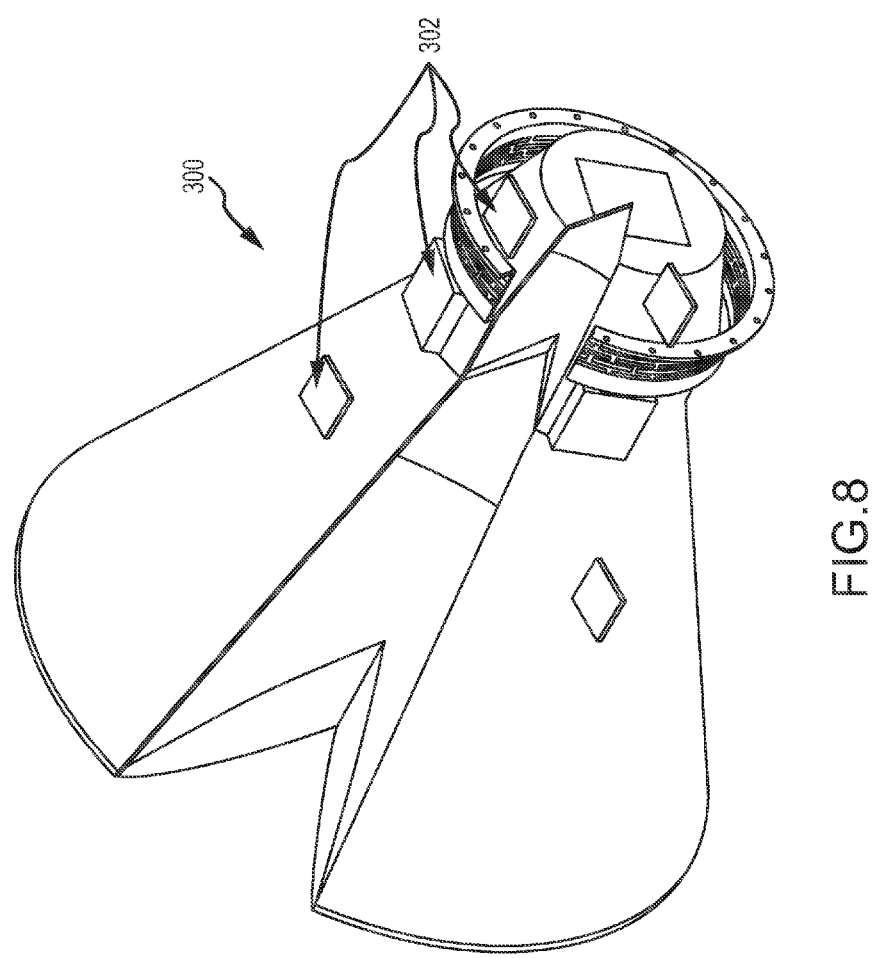
FIG. 8 is a section view of an embodiment of a vehicle's imaging system in which the secondary IMU provides 6-axis measurements to further mitigate sensor drift and includes a cluster of sensors that provide multiple measurements to mitigate sensor noise.

In embodiments as depicted in FIG. 8, a secondary IMU 300 may comprise multiple redundant angle rate sensors 302 for yaw and pitch in a "cluster" and/or may comprise a full 6-axis IMU. The use of a cluster of sensors provides an over determined solution that has a desirable effect of reducing the sensor noise by a factor of root N where N is the number of sensors in the cluster. The full 6-axis secondary IMU produces measures of accelerations in y and z that acting through the lever arm measure the angular rate of change in pitch and yaw of the isolated sub-assembly. These measurements could be used either in place of or in addition to the direct angular rate of change measurements provided by rate sensors.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An imaging vehicle, comprising:
    a frame;
    a propulsion system mounted to the frame;
    a main IMU coupled to measure 6-axis rigid body motion of the vehicle's frame, said 6-axis rigid body motion including linear accelerations in x, y and z directions and angular rates of change of roll, pitch and yaw about the respective x, y and z axes;
    a compliant isolator mounted to the frame;
    a detector assembly for capturing images of scene, said assembly including an isolated sub-assembly comprising a telescope and a detector mounted on said compliant isolator, said isolator and isolated sub-assembly having a resonant frequency between 5 Hz and 5 kHz to partially isolate said sub-assembly from attitude noise of the rigid body motion of the frame, said isolation inducing a pseudo-motion in yaw and pitch between the detector assembly and the frame;
    at least two secondary rate sensors that exhibit a time-varying drift in their measurements, said secondary rate sensors coupled to output secondary measurements of the angular rate of change in yaw and pitch of the isolated sub-assembly, said secondary measurements comprising a rigid body motion component, a time-varying drift component and a pseudo-motion component; and
    a computer that uses the main IMU's yaw and pitch measurements as a reference to remove the rigid body motion component from the secondary measurements of yaw and pitch to generate yaw and pitch difference signals, implements an estimator that processes the difference signals to generates estimates of the time-varying drift component for yaw and pitch, and subtracts the estimates from the secondary measurements of yaw and pitch to produce corrected secondary measurements of yaw and pitch that include the rigid body motion component and pseudo-motion component, said computer processing measurements of the 6-axis rigid body motion and the corrected measurements of the angular rate of change in yaw and pitch of the isolated sub-assembly to estimate a 6-axis position in x, y and z and attitude in roll, pitch and yaw of the isolated sub-assembly.

2. The imaging vehicle of claim 1, wherein said compliant isolator couples low-frequency rigid body motion of the vehicle frame below the resonant frequency to the detector assembly and isolates the sub-assembly from high-frequency attitude noise above the resonant frequency.

3. The imaging vehicle of claim 1, wherein said isolated sub-assembly comprises only the imaging components of said telescope and said detector, said detector assembly further comprising a non-isolated sub-assembly comprising one or more non-imaging components, said isolated sub-assembly configured to minimize the isolated mass.

4. The imaging vehicle of claim 1, wherein estimator comprises a low pass filter that removes pseudo-motion component.

5. The imaging vehicle of claim 1, wherein estimator comprises an integrator.

6. The imaging vehicle of claim 1, wherein estimator comprises a Kalman filter.

7. The imaging vehicle of claim 1, wherein estimator estimates the time-varying drift component in either angular rate of change or accumulated angle in yaw or pitch.

8. The imaging vehicle of claim 1, wherein said at least two secondary rate sensors exhibit a specified drift performance over a first time period, said main IMU exhibiting a specified drift performance over a second time period, said second time period being at least 10 times longer than said first time period.

9. The imaging vehicle of claim 1, wherein said at least two secondary rate sensors exhibit a first specified drift performance over a time period, said main IMU exhibiting a second specified drift performance over the time period, said second specified drift performance being at most one-tenth said first specified drift performance.

10. The imaging vehicle of claim 1, wherein said main IMU comprises a ring laser gyroscope, a fiber gyroscope or a hemispheric resonator gyroscope that provide 6-axis measurements and said at least two secondary rate sensors each comprise a MEMS angular rate sensor.

11. The imaging vehicle of claim 1, wherein said secondary rate sensors comprise an angular rate sensor that directly measures angular rate of change or a linear acceleration sensor that measures linear accelerations that coupled through a finite lever arm between the vehicle's center of gravity and the sensor produces a measurement of angular rate of change.

12. The imaging vehicle of claim 1, further comprising a cluster of secondary rate sensors, said cluster including a first plurality of said secondary rate sensors to measure angular rate of change in yaw and a second plurality of said secondary rate sensors to measure angular rate of change in pitch, said computer processing said plurality of measurements to increase the signal-to-noise ratio.

13. The imaging vehicle of claim 12, wherein said secondary rate sensors comprise MEMS sensors.

14. A kinetic energy kill vehicle (KV), comprising:
a frame;
divert and attitude control thrusters mounted to the frame to alter the trajectory of the KV;
a main IMU coupled to measure 6-axis rigid body motion of the KV, said 6-axis rigid body motion including linear accelerations in x, y and z directions and angular rates of change of roll, pitch and yaw about the respective x, y and z axes;
a compliant isolator mounted to the frame;
a seeker for capturing images of scene, said seeker including an isolated sub-assembly comprising a telescope and a detector mounted on said compliant isolator, said isolator and isolated sub-assembly having a resonant frequency between 5 Hz and 5 kHz to couple low-frequency rigid body motion of the KV below the resonant frequency to the seeker and to partially isolate said sub-assembly from high-frequency attitude noise above the resonant frequency, said isolation inducing a pseudo-motion in yaw and pitch between the detector assembly and the frame;
at least two secondary rate sensors that exhibit a time-varying drift in their measurements, said secondary rate sensors coupled to output secondary measurements of the angular rate of change in yaw and pitch of the isolated sub-assembly, said secondary measurements comprising a rigid body motion component, a time-varying drift component and a pseudo-motion component; and
a computer that uses the main IMU's yaw and pitch measurements as a reference to remove the rigid body motion component from the secondary measurements of yaw and pitch to generate yaw and pitch difference signals, implements an estimator that processes the difference signals to generates estimates of the time-varying drift component for yaw and pitch, and subtracts the estimates from the secondary measurements of yaw and pitch to produce corrected secondary measurements of yaw and pitch that include the rigid body motion component and pseudo-motion component, said computer processing measurements of the 6-axis rigid body motion and the corrected measurements of the angular rate of change in yaw and pitch of the isolated sub-assembly to estimate a 6-axis position in x, y and z and attitude in roll, pitch and yaw of the isolated sub-assembly.

15. The KV of claim 14, wherein estimator comprises one of a low pass filter, an integrator, a Least Squares Estimator and a Kalman filter.

16. The KV of claim 14, wherein said at least two secondary rate sensors exhibit a first specified drift performance over a time period, said main IMU exhibiting a second specified drift performance over the time period, said second specified drift performance being at most one-tenth said first specified drift performance.

17. The KV of claim 14, further comprising a cluster of secondary rate sensors, said cluster including a first plurality of said secondary rate sensors to measure angular rate of change in yaw and a second plurality of said secondary rate sensors to measure angular rate of change in pitch, said computer processing said plurality of measurements to increase the signal-to-noise ratio.

18. The imaging vehicle of claim 17, wherein said secondary rate sensors comprise MEMS sensors.

19. A method of measuring 6-axis position and attitude of a detector assembly on an imaging vehicle, said vehicle comprising a propulsion system mounted to a frame and a main IMU coupled to measure 6-axis rigid body motion of the vehicle's frame, said 6-axis rigid body motion including linear accelerations in orthogonal x, y and z directions and angular rates of change of roll, pitch and yaw about the respective x, y and z axes, said detector assembly including an isolated sub-assembly comprising a telescope and a detector, said method comprising:

mounting the isolated sub-assembly on a compliant isolator to provide a resonant frequency between 5 Hz and 5 kHz for yaw and pitch, said compliant isolator coupling low-frequency rigid body motion of the vehicle below the resonant frequency to the isolated sub-assembly and isolating the isolated sub-assembly from high-frequency attitude noise above the resonant frequency;

using at least two secondary rate sensors that exhibit a time-varying drift to measure the angular rate of change in yaw and pitch of the isolated sub-assembly, said secondary measurements comprising a rigid body motion component, a time-varying drift component and a pseudo-motion component;

using the main IMU's yaw and pitch measurements as a reference to remove the rigid body motion component from the secondary measurements of yaw and pitch to generate yaw and pitch difference signals;

processing the difference signals to generate estimates of the time-varying drift component for yaw and pitch;

subtracting the estimates from the secondary measurements of yaw and pitch to produce corrected secondary measurements of yaw and pitch that include the rigid body motion component and pseudo-motion component; and processing measurements of the 6-axis rigid body motion and the corrected measurements of the angular rate of change in yaw and pitch of the isolated sub-assembly to estimate a 6-axis position in x, y and z and attitude in roll, pitch and yaw of the isolated sub-assembly.

20. The method of claim 19, wherein a cluster of secondary rate sensors are used to measure the angular rate of change in yaw and pitch, said cluster including a first plurality of MEMS sensors to measure angular rate of change in yaw and a second plurality of MEMS sensors to measure angular rate of change in pitch.

* * * * *